UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

ORANGE TO RED DYESTUFFS ABLE TO BE CHROMATED AND A PROCESS OF MAKING SAME.

1,210,808. Specification of Letters Patent. Patented Jan. 2, 1917.

No Drawing. Application filed December 31, 1915. Serial No. 69,652.

*To all whom it may concern:*

Be it known that I, Dr. CARL JAGERSPACHER, chemist, a citizen of the Swiss Republic, and resident of Basel, Switzerland, have invented new and useful Orange to Red Dyestuffs Able to be Chromated and a Process of Making Same, of which the following is a full, clear, and exact specification.

It is known that only the diazo derivates of orthoaminonaphthols and of their substitution products give by their combination with the pyrazolones usually combined with azo bodies, dyestuffs furnishing dyeings which are fast to fulling and to potting after they have been chromated, while the diazo derivates of orthoaminophenol and of its derivates do not give such dyestuffs. Thus for instance the dyestuff "orthodiazonaphtholsulfonic acid 1:2:4+phenylmethylpyrazolone" is very fast to fulling and potting, while the combination "orthodiazophenolsulfonic acid + phenylmethylpyrazolone" possesses an absolutely insufficient fastness to fulling and potting.

I have now found, that it is possible to obtain, not only with the diazo derivates of orthoaminonaphthols and of their substitution products, but also with the diazo derivates of orthoaminophenols and of their substitution products, azo dyestuffs showing besides a very good fastness to fulling and potting also a prominent fastness to light, after they have been chromated, if the said diazo derivates are combined with the pyrazolones of the benzene and the naphthalene series which are substituted by hydroxyl in the phenyl or naphthyl nucleus. Such oxyphenyl- or oxynaphthylpyrazolones were hitherto not employed practically for the manufacture of dyestuffs to be chromated subsequently. The observation that they furnish with the diazo compounds derivated from the orthoaminonaphthols as well as with those derivated from the orthoaminophenols dyestuffs which are prominent fast after they have been chromated, is therefore absolutely new and surprising. The said oxyphenyl- or oxynaphthylpyrazolones are obtained in the known manner by condensing the oxy derivates of phenyl- or naphthylhydrazin and their substitution products, prepared themselves from the corresponding diazophenols or diazonaphthols, for instance, with acetylic acetic ester and producing subsequently the nucleus closing required for the formation of a pyrazolone derivate. The thus obtained dyestuffs derived from oxyphenyl- or oxynaphthylpyrazolones and orthodiazophenol derivates dye wool yellow to Bordeaux-red tints turning to orange to red by their subsequent treatment with chromium compounds, as for instance chromium salts or bichromates. The subsequently chromated dyeings possess an excellent fastness to fulling, potting and light, similar to that of the dyestuffs derived from orthoaminonaphtholsulfonic acids and the hitherto employed pyrazolones. The new dyestuffs permit to produce on wool valuable, fast, orange to yellowish red chromated tints which could not be produced with the dyestuffs hitherto subsequently chromated.

If instead of diazophenol derivates the diazooxids of the naphthalene series are combined in an analogous manner with oxyphenyl- or oxynaphthylpyrazolones, bluish-red dyestuffs are obtained which are still more fast to fulling and potting than those above specified, that is to say than the best hitherto known red dyestuffs subsequently chromated.

Obviously the production of fast dyeings with the dyestuffs of the present application can be effected, not by subsequent chromating, but also according to other processes employed for mordant-dyestuffs, as for instance by dyeing on chromium mordanted wool or by dyeing in a bath containing at least a solved chromate.

The new dyestuffs constitute in a dry state yellow to red powders, soluble in concentrated sulfuric acid with intense colorations and in water with yellow to red colorations.

*Example.*—Dyestuff from orthoaminophenolsulfonic acid and the pyrazolone derived from paranitroorthoaminophenol.—

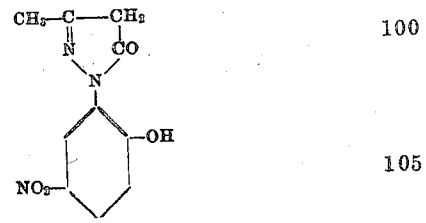

18.9 parts orthoaminophenolsulfonic acid are diazotized in a known manner and joined to the soda alkaline solution of 23.5 parts 5-nitro-2-oxyphenylmethylpyrazolone. The immediately formed dystuff is salted out, pressed and dried. It constitutes in a dry state a yellow powder dissolving in water and concentrated sulfuric acid to yellow solutions. It dyes wool in an acid bath yellow tints turning to red-orange by a subsequent treatment with chromium. The subsequently chromated dyeings possess a prominent fastness to fulling, potting and light.

The following tabular exhibit indicates the properties of various dyestuffs prepared according to the invention:

| Dyestuff resulting from— | | Solution of the sodium salt in— | | Dyeing on wool. | |
|---|---|---|---|---|---|
| The methyl pyrazolone derived from— | And the diazo derivate of— | Water. | Concentrated $H_2SO_4$. | Directly. | Subsequently chromated. |
| Para-nitro-ortho-aminophenol | o-Amino-phenol-sulfonic acid | Yellow | Yellow | Yellow | Red-orange. |
| Ortho-aminophenol-sulfonic acid | o-Aminophenolsulfonic acid | Orange | Yellow | Yellow | Red-orange. |
| Do | p-Nitro-o-aminophenol | Red | Yellow | Red | Red-orange. |
| Do | Nitroamino-p-cresol | Blue-red | Orange-red | Bordeaux | Red. |
| Do | Picramic acid | Brown | Yellow | Brown | Brown. |
| Do | 1:2:4-Aminonaphthol-sulfonic acid | Yellow | Blue-red | Orange | Blue-red. |
| Para-chlor-ortho-aminophenol | o-Aminophenolsulfonic acid | Yellow | Blue-red | Yellow | Red-orange. |
| Do | o-Amino-p-cresolsulfonic acid | Yellow | Red | Orange-yellow. | Red. |
| Para-aminosalicylic acid | o-Aminophenolsulfonic acid | Yellow | Yellow | Yellow | Red-orange. |
| Do | p-Nitro-o-aminophenol | Red | Yellow | Red | Red-orange. |
| Do | o-Amino-p-cresolsulfonic acid | Red | Orange-red | Orange-yellow. | Red. |
| Do | Nitroamino-p-cresol | Red | Orange-red | Red-brown | Red. |
| Do | p-Chlor-o-aminophenol-o-sulfonic acid | Brown-red | Orange | Orange | Red. |
| Do | Picramic acid | Orange | Yellow | Brown | Red-brown. |
| 2:5:7-Aminonaphtholsulfonic acid | 1:2:4-Aminonaphtholsulfonic acid | Orange | Blue-red | Orange | Red. |
| 2:5:7-Aminonaphtholsulfonic acid | o-Aminophenolsulfonic acid | Orange | Red-brown | Orange | Brown. |
| Do | p-Nitro-o-aminophenol | Red-brown | Brown | Brown-red | Brown. |
| 4-Sulfo-2-amino-1-phenol-6-carbonic acid | 1:2:4-Aminonaphtholsulfonic acid | Orange | Red-violet | Orange | Blue-red. |
| Do | p-Nitro-o-aminophenol | Orange | Orange | Red-orange | Red-orange. |
| Para-aminosalicylic acid | Nitroamino-p-cresol | Blue-red | Blue-red | Bordeaux | Yellow-red. |
| | p-chlor-o-aminophenol | Yellow | Brown | Orange | Red. |

What I claim is:

1. The described process for the manufacture of orange to red dyestuffs able to be chromated, consisting in combining an orthooxydiazo compound with a pyrazolone derivate of the benzene or the naphthalene series substituted by hydroxyl in the phenyl- or naphthyl nucleus.

2. The described process for the manufacture of orange to red dyestuffs able to be chromated, consisting in combining the diazo derivative of an orthoaminophenol- or an orthoaminonaphthol compound with a pyrazolone derivate of the benzene or the naphthalene series substituted by hydroxyl in the phenyl- or naphthyl nucleus.

3. As new products the described orange to red dyestuffs able to be chromated, which are derived from an orthooxydiazo compound and a pyrazolone derivate of the benzene or the naphthalene series substituted by hydroxyl in the phenyl- or naphthyl nucleus and which constitute yellow to red powders soluble in concentrated sulfuric acid with intense colorations and in water to yellow to red solutions dyeing animal fibers according to the known processes used for chromium dyestuffs, orange to brown and red tints fast to fulling, potting and light.

In witness whereof I have hereunto signed my name this second day of December, 1915, in the presence of two subscribing witnesses.

Dr. CARL JAGERSPACHER.

Witnesses:
ARNOLD ZUBER,
ORMOND RITTER.